Nov. 14, 1939.  G. A. TINNERMAN  2,179,604
SHELF SUPPORTING STUD OR THE LIKE
Filed May 14, 1938
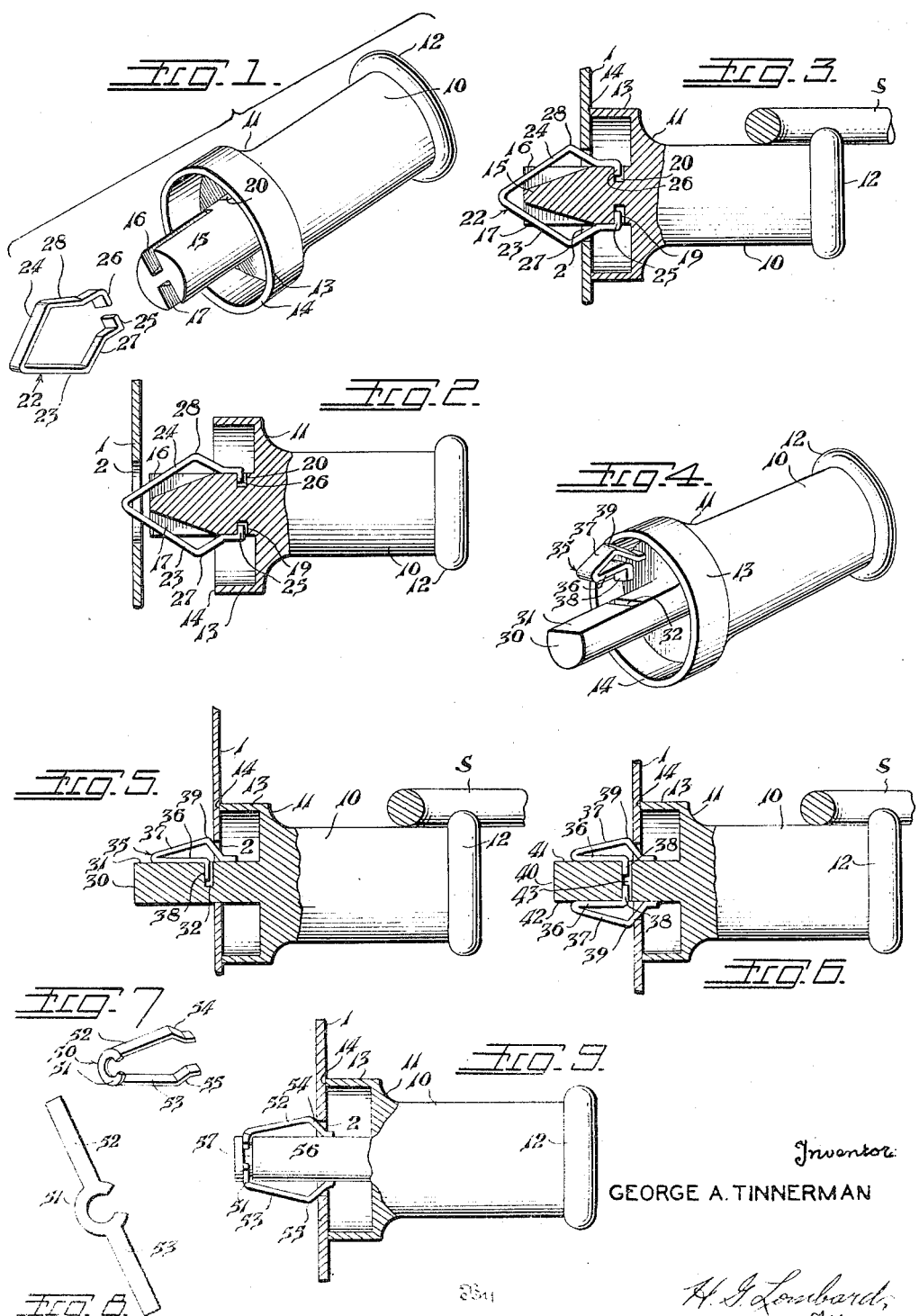
Inventor
GEORGE A. TINNERMAN Patented Nov. 14, 1939

2,179,604

UNITED STATES PATENT OFFICE 2,179,604

SHELF SUPPORTING STUD OR THE LIKE

George A. Tinnerman, Rocky River, Ohio, assignor to Albert H. Tinnerman, Cleveland, Ohio Application May 14, 1938, Serial No. 208,044

8 Claims. (Cl. 248—239)

This invention deals with improvements in studs, knobs or the like, in general, and is directed, more particularly, to an improved shelf supporting device for use with sliding shelves or trays employed in refrigerators, storage cabinets and other structures embodying a sheet metal supporting part or wall surface.

A primary object of the invention is to provide an improved shelf supporting stud or similar device, the stud being provided with an integral connecting stem carrying securing means designed for mounting the device onto a sheet metal wall member entirely from one side without the need of special backing or retaining means at the reverse side thereof.

A further object of the invention is to provide an improved shelf supporting stud, knob or the like molded from plastic, non-resonant material sufficiently hard in its completed form to resist wear due to the sliding of the shelf thereon, and comprising an integral connecting stem including means having substantial snap stud fastening engagement in a socket opening provided in a sheet metal wall member for mounting the supporting stud thereon.

Another object of the invention is to provide in such a shelf supporting stud or knob construction, an arrangement whereby the same may be rigidly attached to an enameled sheet metal wall and firmly secured against the enameled surface thereof without cracking or defacing the enamel either upon the initial application of the device or after a period of use in a completed installation.

The use of plastic, non-resonant material in providing shelf supporting studs is especially advantageous in the case of insulated cabinets wherein an inner metal lining is employed, inasmuch as a supporting stud may then be mounted directly on the lining and put to use without setting up undesirable vibrations upon movement of the shelf thereon. This advantage may be appreciated when it is considered that the lining in a refrigerator, for example, is usually of such a large plane surface as to act as a substantial sounding board amplifying initially slight vibrations which occur in the case of metal to metal contact between the shelf and a metallic supporting stud.

Molded plastic parts such as the supporting studs, knobs or the like referred to herein, have as their main ingredient some form of thermoplastic material such as resin, shellac, celluloid, synthetic rubber, etc. which is mixed with a filler, coloring matter and lubricant, placed into a suitable mold, and subjected to heat and/or pressure or both, simultaneously. The plastic mix is thus transformed into a homogeneous solid mass which when subjected to a curing cycle is sufficiently hard for any reasonable required service and is also non-resonant and impervious to liquids.

Hardened plastic shelf supporting studs and similar objects thus provided are possessed of certain properties and characteristics which make them more useful and advantageous in any number of applications than the more common type of materials. Such properties, for example, are exceptional beauty, unusual dielectric properties, relatively high impact strength, high heat resistance, chip-, rust-, corrosion-, and shatter-proofness and extreme hardness, toughness and durability.

It is the property of extreme hardness, coupled with brittleness, which has made it difficult and in some applications prohibitive to provide an effective, satisfactory and inexpensive means for securing, connecting or mounting a plastic shelf supporting stud, knob or the like, onto a sheet metal wall surface. And accordingly, it has heretofore been necessary to provide the plastic stud with some form of screw-threaded fastening means such as threaded metallic inserts molded into the plastic part, or screw-threaded fastening devices driven into tapped holes provided therein.

However, threaded metallic inserts molded with the plastic stud not only are expensive but are otherwise objectionable in that they make for added shipping weight, require longer curing cycles for hardening, and involve greatly increased costs in production for special forms and expensive molding equipment which are necessary to insure that the plastic composition, when being flowed into the mold, will not disturb the position of the metallic insert in the completed stud or similar object.

In the use of screw-threaded fastening devices in plastic parts, a hole must be bored, the hole tapped, and the fastening device laboriously threaded into the tapped hole. Not only is this procedure objectionable by reason of the expense involved in the several time-consuming manufacturing operations required, but also because an inferior, unsatisfactory product frequent results due to the fact that the screw threads thus provided in the plastic part easily cross and tend to break down quickly, and which, most often, are not in proper alignment due to the indefinite number of porous, rough spots, thin-walled gas pockets, and other mold imperfections which prevent the screw thread of a fastening from being accurately and precisely threaded into the tapped hole to provide an accurate, precise, rigid mounting.

A most important problem involved in the use of such supporting studs resides in the fact that the sheet metal wall surface or lining, as in a refrigerator, is usually accessible from one side only in a completed installation, wherefor the securing means provided for the stud must be capable of being applied to rigid, positive fastening engagement entirely from the accessible side. To this end, the present invention contemplates generally the provision of a connecting stem formed integrally on the supporting stud in the molding operation and carrying, what may be termed, a yieldable securing means having substantial snap stud fastening engagement in a socket opening provided in the sheet metal part in mounting the stud in fixed, rigid relation thereon.

A more specific object, therefore, is to provide in such a hardened plastic supoprting stud or the like having a connecting stem integrally provided thereon, an arrangement whereby said stem is suitably formed to provide for attaching a securing means thereto preparatory to the application thereof to a socket opening in a sheet metal part in effecting a positive rigid mounting of the stud thereon by said securing means.

Another object is to provide in such a plastic shelf supporting stud, knob or like part, a securing arrangement comprising an integral connecting stem and independent securing means carried thereby, said securing means having substantial snap stud fastening engagement in a socket opening in a wall member and being so designed to take the thrust in the applied mounted position of the stud thereby minimizing possibility of fracture of the integral connecting stem portion thereof when the stud is put to use.

A more specific object is to provide a hardened plastic shelf supporting stud, knob or the like having an integral connecting stem arrangement including a yieldable securing means comprising a sheet metal clip device having substantial snap stud fastening engagement in a socket opening in a sheet metal part in providing a fixed, rigid mounting for the shelf supporting stud or knob thereon.

Further objects of the invention, and other new and useful features in the construction, arrangement and general combination of parts, will be readily apparent to those skilled in the art as a description thereof proceeds with reference to the accompanying drawing in which like reference characters designate like parts throughout the same, and in which:

Fig. 1 is a perspective view of an improved shelf supporting stud, knob or the like, of the invention, showing one form of yieldable securing means about to be assembled to the integral connecting stem portion thereof;

Fig. 2 is a fragmentary section through a sheet metal wall, such as the lining of a refrigerator, showing the supporting stud and yieldable securing means assembled therewith about to be applied to a socket opening, the stud being partly broken away to show the details of construction of the connecting stem portion thereof;

Fig. 3 is a similar view showing in elevation the supporting stud and yieldable securing means attached thereto in applied mounted position on the sheet metal wall;

Fig. 4 illustrates, in perspective, a further embodiment of the invention in which another form of yieldable securing means is shown about to be applied to assembled relation with the integral connecting stem of the supporting stud;

Fig. 5 is a fragmentary section through a sheet metal wall showing in elevation this form of the invention in applied mounted position on a sheet metal wall member;

Fig. 6 is a similar view showing an alternate construction in which a pair of securing devices illustrated in Fig. 4 are employed for mounting the shelf supporting stud or the like in position on a sheet metal wall;

Fig. 7 shows, in perspective, a still further form of securing means per se which is employed in another embodiment of the invention;

Fig. 8 represents a blank from which the securing means shown in Fig. 7 is constructed; and, Fig. 9 is a fragmentary section through a sheet metal wall showing in elevation the mounting of a shelf supporting stud employing the securing means illustrated in Figs. 7 and 8.

Referring now, more particularly, to Figs. 1 to 3 inclusive of the drawing, a preferred form of shelf supporting stud is shown in connection with a fragment of a refrigerator lining or casing which, of course, may be a fragment of any similar member to which it is desired to attach a stud, knob, or the like in accordance with the present invention. The lining is usually a sheet metal wall having a porcelain enameled surface which forms a highly desirable finish but renders the mounting of shelf supporting studs thereon a difficult problem in that cracking and chipping of the porcelain occurs all too frequently in the application of the securing means for such studs. A well known type of shelving comprises a parallel wire grid having a relatively heavy wire or rod beading S, around the periphery thereof, this beading resting in the guideway intermediate spaced shoulders formed on the connecting stud, as shown in Fig. 3. In order that the supporting studs may be secured thereto, the lining or wall member 1, is provided with apertures or socket openings 2 formed therein at determinately located points depending on the position it is desired that the shelf be supported in a completed installation. Such perforations are usually punched in the plate constituting the refrigerator lining or other wall member prior to the assembly thereof in a completed structure whereupon they become accessible from one side only; and it is this condition which makes it essential that the securing means for mounting the supporting stud be capable of installation to complete, positive, fastening engagement in a socket opening entirely from the accessible side.

As shown in Fig. 1, the shelf supporting stud 10, knob or the like, may assume the form of a substantial spool-shape having a groove in the body portion thereof providing spaced shoulders 11, 12 between which the shelf rod S may rest, the outer shoulder 12 preventing the shelf rod from sliding off the end thereof. Thus, the said shoulders 11, 12 of the shelf supporting stud present a substantial guideway for the shelf beading such that the shelf is freely movable thereon and sliding thereof is facilitated should it be desired to remove the shelf from the refrigerator for cleaning, etc. And inasmuch as the studs are preferably constructed of hardened plastic material, the same not only are strong and durable, but also non-resonant thereby permitting ready sliding of the shelf rod thereon without rattling, squeaks, vibration, and other annoying sounds which result from sliding a shelf over metallic supporting studs.

In the use of such hardened plastic materials in providing a shelf supporting stud in accordance with the present invention, it is possible to mold the same, at little or no added cost, with an integral connecting stem 15, and a flange or skirt 13 having a free edge serving as a substantial peripheral bearing surface 14 in a manner presently to be described. Preferably the stem 15 is so designed as to be partly received within the peripheral skirt 13, it being quite obvious that the same may be of any suitable cross-section, form or shape and, if desired may comprise an extension of a plastic stud molded solid without a flange or skirt.

In providing for the attachment of the securing means thereto in preparing the mounting for the stud in one form of the invention, the said connecting stem 15 thereof, Figs. 1 and 2, is suitably formed to provide opposed recesses 16, 17 together with opposed apertures 19, 20 adapted to receive the yieldable arms of the securing means and otherwise retain the same in assembled relation thereon preparatory to the application thereof to the socket opening 2 in the sheet metal wall 1 as shown in Fig. 2. The required specific formation of the connecting stem is provided for preferably in the molding operation or in any other suitable manner thereafter as by a sawing operation, milling cut, drilling, etc. In any event, the connecting stem thus provided is admirably suited for retaining thereon an independent securing means 22 comprising a substantial clip device constructed from a suitable strip of metal such as spring steel, cold rolled sheet metal, wire or the like.

As best seen in Fig. 1, the securing means 22 is extremely simple in construction and therefor may be provided at very low cost from a small, inexpensive section of sheet metal preferably spring steel, bent into a substantial V-shape to form a pair of spring arms 23, 24, integrally united to present a substantial pilot at the leading end thereof facilitating application to the socket opening. In the securing means thus provided, the free extremities of the spring arms may be formed in any suitable manner to provide means for attaching the same to the connecting stem portion of the shelf supporting stud. Preferably the extremities are inturned toward each other to provide cooperating gripping fingers 25, 26 receivable in the opposed apertures 19, 20 of the connecting stem in substantial clasping engagement therewith as shown in Fig. 2. Intermediate their lengths the spring arms are provided with substantial cam shoulders 27, 28, which are preferably tapered and spaced apart in normal untensioned relation a distance greater than the socket opening 2 to engage therein under compression and thereby provide a continuously effective spring holding action in the mounting for the stud at all times. The provision of such tapered cam shoulders on the spring arms not only permits the use of a certain size stud with wall members of several thicknesses, but also ensures a positive, self seating of the stud in rigid applied position by reason of the expansive force of the spring arms in causing such shoulders to ride on the corner edges of the socket opening to the point of most effective fastening thereby ensuring a rigid, positive mounting for the stud.

From the foregoing, it will be understood that the elements comprising the shelf supporting stud, knob or the like of the present invention in the embodiment shown in Figs. 1 to 3 inclusive, are easily and quickly assembled in a completed installation simply by spreading the spring arms 23, 24 of the securing clip to seat in the recesses 16, 17 of the connecting stem with the gripping fingers 25, 26 thereof disposed in the opposed apertures 19, 20 substantially as shown in Fig. 2. To this end, the slots presented by said recesses in the connecting stem are preferably tapered thereby presenting a substantial wedging portion adapted to readily spread the spring arms of the securing means when advanced axially to assembled relation therewith.

With the securing means thus assembled onto the connecting stem, the stud is easily and quickly applied to mounted position on the wall member by axial force provided for in a substantial pushing operation, thereby causing the V-shaped portions of the spring arms to undergo a substantial camming action in the socket opening and be compressed toward each other sufficient to permit the shoulders 27, 28 to clear the socket opening and thus become disposed in positive fastening engagement at the reverse side of the wall member with the bearing surface 14 of the flange 13 in substantially flush engagement with the forward side thereof as shown in Fig. 3. In this relation, the spring arms 23, 24 of the securing means tend to assume their normal spaced relation, thereby exerting an expansive force on the tapered cam shoulders 27, 28 to urge the same to firm, positive, substantially locked engagement with the corner edges and adjacent area of the socket opening at the reverse side of the wall member under, what may be termed, continuously effective spring holding action. Of course, if a positive locked mounting is desired the shoulders 27, 28 may be designed more pronounced to present substantial abutments engaging a material area or face of the wall member at the reverse side thereof. However, the provision of tapered, substantial cam shoulders on the spring arms is more advantageous in that the use of a certain size stud with wall members of several thicknesses is possible and also, a positive, self seating of the stud in rigid mounted position is ensured by reason of the expansive action supplied by the spring arms to the said tapered cam shoulders to cause the same to ride on the corner edges of the socket opening to the point of most effective fastening engagement substantially as shown in Fig. 3. It is therefore to be appreciated that the spring clip securing means in this embodiment of the invention is always effective to cause the tapered cam shoulders thereon to compensate for slight clearances and other manufacturing variations in the size of the socket opening and the thickness of the wall member, and likewise, any looseness or play in the connection after a period of use is immediately taken up such that an installation embodying the supporting stud mounting of the present invention is rigid and positive throughout its entire length of service.

On tightening of the supporting stud in its final applied mounted position, it is to be noted that the main part thereof which bears directly on the exposed face of the wall member is the peripheral bearing surface 14 of the flange 13, the snap stud locking action of the connecting stem being effected practically entirely to the reverse side of the wall member, as aforesaid. Thus, the actual bearing area of the stud not only is reduced but extends over a relatively wide portion of the wall member. And since the wall member has usually an enameled porcelain finish, this arrangement is highly advantageous in that when a mounted supporting stud is put to use as by placing an article on the shelf supported thereby, the resultant bending stress transmitted to the wall member is necessarily decreased and distributed over a comparatively large area wherefor danger of cracking or chipping of the enamel is minimized and, in fact, practically eliminated.

Figs. 4 and 5 show a further embodiment of the invention in which another form of yieldable securing means is employed with an integral connecting stem provided on the plastic shelf supporting stud, knob or the like. Thus, as illustrated in Fig. 4, the stud is formed in any suitable manner, aforesaid, with an integral connecting stem 30 having a substantially flat face 31 providing a generally D-shaped cross-section thereto. A transverse slot 32 is provided in the connecting stem, said slot having its opening in the flat face 31 and extending partly or wholly therethrough, as desired, to serve as a suitable socket adapted to receive and frictionally hold the attaching finger of the clip securing means 35 to retain the same in assembled relation on the connecting stem preparatory to the operation for mounting the stud. The said clip securing means 35, Fig. 4, is preferably constructed from a small, inexpensive section of sheet metal formed into a modified V-shape comprising a pair of integral arms 36, 37, the arm 36 serving as a substantial bearing member and carrying an attaching finger 38. The arm 37 is preferably inclined toward the leading end of the device and formed with a tapered, substantial cam shoulder 39, with the extremity thereof substantially flat, to provide an auxiliary bearing surface, if desired.

The connecting arrangement thus provided for a shelf supporting stud or the like may be easily and quickly assembled simply by fitting the attaching finger 38 of the securing clip into slot 32 of the connecting stem wherefor the bearing arm 36 is positively seated on the flat face 31 thereof with the arm 37 of the clip extending free for yieldable movement relative thereto. In this relation, the shoulder 39 thereon is capable of substantial snap fastening engagement with the peripheral edge of the socket opening in a wall member; and thus, referring to Fig. 5, it will be understood that in mounting a stud provided with this form of securing means, the inclined, yieldable arm 37 undergoes a substantial camming action on being advanced axially in the socket opening and is thereby compressed sufficient to permit the cam shoulder 39 thereon to clear the socket opening and become disposed at the reverse side of the wall member in firm, positive engagement therewith substantially in the manner described with reference to the form of the invention shown in Figs. 1–3 inclusive.

Fig. 6 represents an alternate construction in which a plurality of the securing clips just described may be employed. Although any suitable number of such securing devices obviously may be incorporated in an assembly, for purposes of illustration, a pair of the clip devices are shown so positioned on the connecting stem to effect an engagement of the snap stud shoulders thereof in the socket opening at diametrically opposed points. Thus, the integral connecting stem 40 is formed with opposed flat faces 41, 42 and a transverse slot 43 extending completely therethrough to present opposed apertures receiving the attaching fingers 38 of the securing devices.

Accordingly, the arms 36 of the clips are seated firmly on the said flat faces 41, 42 of the connecting stem in assembled relation therewith wherefor the shoulders 39 of the yieldable arms 37 are capable of substantial snap fastening engagement in the socket opening in the wall member on being applied thereto substantially in the manner described with reference to the embodiment of Figs. 4 and 5.

Figs. 7–9 inclusive illustrate a still further embodiment of the invention in which another form of clip securing means is employed with an integral connecting stem provided on a plastic shelf supporting stud, or the like. The securing clip device 50, Fig. 7, may be constructed from an inexpensive section of sheet metal such as represented in Fig. 8, which is suitably formed to provide a combined slip collar attaching portion 51 carrying one or more, preferably two, spring arms 52, 53, provided with tapered cam shoulders 54, 55. The said collar portion 51 is split by a cut-out area substantially as shown in Fig. 7 such that the split sections thereof are relatively yieldable and may be easily applied to fixed engagement with the connecting stem 56, Fig. 9, through the space therebetween substantially in the manner of a snap ring.

Preferably the connecting stem 56 is provided with a groove 57 presenting a reduced neck portion which the slip collar attaching portion 51 is designed to clasp such that the side-walls of said groove prevent relative axial movement of the clip in assembled relation on the stem during the application thereof to the socket opening in the wall member in mounting the stud. The yieldable spring arms 52, 53, of the securing clip are thus disposed in fixed relation on the integral connecting stem, and, referring to Fig. 9, it will be understood that the inclined surfaces thereof undergo a substantial camming action on being advanced in the socket opening thereby being compressed sufficient to permit the cam shoulders 54, 55 thereon to clear the socket opening and become disposed at the reverse side of the wall member in firm, positive engagement therewith substantially in the manner described with reference to the form of the invention shown in Figs. 1–3, inclusive.

The various forms of clip fastening constructions disclosed herein for mounting a plastic shelf supporting stud, knob or the like have many advantages over the prior art structures, one of the most important of which is the comparatively low cost of the clip securing devices employed and the ease and facility with which such devices may be incorporated in an assembly and applied to a socket opening in a wall member in providing a fixed, rigid mounting for a stud or like plastic part.

Another advantage resides in the fact that the various fastening constructions for mounting a plastic part are extremely strong and durable and highly satisfactory by reason of the provision of the integral connecting stem arrangement together with independent, metallic securing means designed to take the strain and thrust incident to the application and use of the stud in applied mounted position thereby minimizing possibility of fracture of the plastic stud, particularly the integral connecting stem portion thereof.

While this invention has been described in detail with specific examples such examples are illustrative only, since it will be apparent to those skilled in the art that other modifications within the spirit and scope of the invention may be constructed without departing from the teachings or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A supporting stud, knob or the like mounted on a wall member provided with a socket opening, said stud comprising a body formed with an integral, rigid connecting stem projecting therefrom, said stem having a recess on its outer surface, and a one-piece, independent, metallic clip securing means carried by said connecting stem, said clip securing means comprising an attaching element cooperating with said recess on the stem for holding the same in assembled relation therewith and a yieldable arm provided with a shoulder adapted for snap fastening engagement in said socket opening to retain the stud or the like in fixed, rigid mounted position on the said wall member.

2. A hardened plastic supporting stud, knob or the like mounted on a wall member provided with a socket opening, said plastic stud comprising a body formed with an integral, projecting connecting stem provided with a recess on its outer surface, and independent, metallic securing means carried by said connecting stem, said securing means comprising a one-piece, sheet metal clip device including an attaching element receivable in said recess provided on the stem for holding the same in assembled relation therewith and a yieldable arm provided with a shoulder adapted for snap fastening engagement in said socket opening under continuously effective spring tension, whereby said plastic stud or the like may be applied to fixed, rigid mounted position on the said wall member entirely from one side thereof.

3. A supporting stud, knob or the like mounted on a wall member provided with a socket opening, said stud comprising a body formed with a peripheral skirt and an integral connecting stem projecting therefrom partly received in said skirt, said stem having a recess on its outer surface, and independent, metallic securing means carried by said connecting stem, said securing means comprising a one-piece, sheet metal clip device including an attaching element receivable in said recess provided on the stem for holding the same in assembled relation therewith and a yieldable arm provided with a cam shoulder adapted for snap fastening engagement in said socket opening under continuously effective spring tension, whereby said plastic stud or the like may be applied entirely from one side of said wall member to seat said cam shoulder of the securing means at the reverse side thereof and thereby retain said stud or the like in firm, fixedly mounted position thereon.

4. A hardened plastic supporting stud, knob or the like mounted on a wall member provided with a socket opening, said plastic stud comprising a body formed with a peripheral skirt and an integral, rigid connecting stem projecting therefrom and partly received in said skirt, said stem having a recess on its outer surface and independent, metallic securing means carried by said connecting stem, said securing means comprising a one-piece, sheet metal clip device including an attaching element receivable in said recess in the stem for holding the clip in assembled relation therewith and a yieldable arm inclined toward the leading end of the stem and provided with a tapered cam shoulder adapted for snap fastening engagement in said socket opening under continuously effective spring tension, whereby said plastic stud or the like may be applied entirely from one side of said wall member to seat said cam shoulder of the securing means at the reverse side thereof and thereby retain said stud in firm, fixedly mounted position thereon.

5. A supporting stud, knob or the like mounted on a wall member provided with a socket opening, said stud comprising a body formed with an integral connecting stem projecting therefrom provided with assembling apertures on its outer surface, and independent, metallic clip securing means carried by said integral connecting stem, said clip securing means comprising a pair of spring arms provided with attaching elements receivable in said apertures provided in the connecting stem for holding the clip in assembled relation therewith, one of said spring arms being provided with a shoulder adapted for snap fastening engagement in said socket opening under continuously effective spring tension to retain the stud in fixed, rigid mounted position on the said wall member.

6. A supporting stud, knob or the like mounted on a wall member provided with a socket opening, said stud comprising a body formed with an integral connecting stem projecting therefrom, said stem being provided with oppositely disposed assembling apertures on its outer surface, and independent, metallic clip securing means carried by said integral connecting stem, said clip securing means comprising a strip of sheet metal bent into a substantial V-shape providing a pair of spring arms including attaching fingers receivable in said apertures provided in the connecting stem for holding the clip in assembled relation therewith, one of said spring arms being provided with a shoulder adapted for snap fastening engagement in said socket opening under continuously effective spring tension to retain the stud in fixed, rigid mounted position on the said wall member.

7. A supporting stud, knob or the like mounted on a wall member provided with a socket opening, said stud comprising a body formed with an integral, projecting connecting stem provided with an assembling slot on its outer surface, and independent, metallic clip securing means carried by said integral connecting stem, said clip securing means comprising a pair of arms one of which serves as a bearing arm resting on said stem and is provided with an attaching element receivable in said slot provided in the connecting stem for holding the clip in assembled relation therewith, the other of said arms being a substantial spring arm and provided wth a shoulder adapted for snap fastening engagement in said socket opening under continuously effective spring tension to retain the stud in fixed, rigid mounted position on the said wall member.

8. A supporting stud, knob or the like mounted on a wall member provided with a socket opening, said stud comprising a body formed with an integral, projecting connecting stem provided with a groove on its outer surface, and a one piece, independent, metallic clip securing means carried by said integral connecting stem, said clip securing means comprising a snap collar attaching portion and an integral spring arm, said snap collar attaching portion being received in said groove in the connecting stem for holding the clip in assembled relation therewith, and said spring arm being provided with a shoulder adapted for snap fastening engagement in said socket opening under continuously effective spring tension to retain the stud in fixed, rigid mounted position on the said wall member.

GEORGE A. TINNERMAN.